United States Patent [19]

Shibahara

[11] Patent Number: 5,055,944

[45] Date of Patent: Oct. 8, 1991

[54] IMAGE SIGNAL PROCESSING APPARATUS

[75] Inventor: Kenji Shibahara, Akashi, Japan

[73] Assignee: Mita Industrial Co., Ltd., Osaka, Japan

[21] Appl. No.: 436,773

[22] Filed: Nov. 15, 1989

[30] Foreign Application Priority Data

Nov. 15, 1988 [JP] Japan .................................. 63-289491
Nov. 15, 1988 [JP] Japan .................................. 63-289493

[51] Int. Cl.5 .............................................. H04N 1/40
[52] U.S. Cl. ..................................... 358/465; 358/447;
358/461; 358/464; 358/466; 382/50
[58] Field of Search ............... 358/447, 461, 462, 464,
358/465, 466, 467; 382/50, 51

[56] References Cited

U.S. PATENT DOCUMENTS

| | | | |
|---|---|---|---|
| 4,466,123 | 8/1984 | Arai et al. | 358/464 |
| 4,553,173 | 11/1985 | Kawamura | 358/465 |
| 4,554,583 | 11/1985 | Saitoh et al. | 358/461 |
| 4,562,486 | 12/1985 | Suzuki et al. | 358/466 |
| 4,691,240 | 9/1987 | Kurusu et al. | 358/464 |
| 4,723,173 | 2/1988 | Tanioka | 358/465 |
| 4,783,836 | 11/1988 | Takashima | 382/50 |

Primary Examiner—Joseph A. Orsino
Assistant Examiner—Dov Popovici
Attorney, Agent, or Firm—Beveridge, DeGrandi & Weilacher

[57] ABSTRACT

According to an image signal processing apparatus in accordance with the present invention, an input signal is converted to a digital image signal and then the digital image signal is cyclicly shifted. Therefore, a desired signal component can be collected on a first or second level side. Therefore, a signal can be divided into bilevels in reference to one threshold value or it can be divided into multiple levels in reference to a plurality of threshold values. As a result, it is possible to precisely extract contours of the image signal even if there is a small density difference between a background signal and an information signal. In addition, a background can be converted between white and black.

8 Claims, 9 Drawing Sheets

ORIGINAL PICTURE

FIG. 11B  COPY

IMAGE SIGNAL PROCESSING APPARATUS

BACKGROUND OF THE INVENTION

1. Field of the Invention

The present invention relates to an image signal processing apparatus and, more particularly, to an image signal processing apparatus comprising means for digitaizing an image signal.

An electrophotographic copying apparatus and a facsimile terminal equipment read a document and copy its image into a desired form or transmit it. They comprise an image signal processing apparatus for processing a read image signal for those operation. The present invention aims to improve such an image signal processing apparatus.

2. Description of the Conventional Art

A contour extracting process is one of signal processes performed in the image signal processing apparatus. A method for extracting contours of image information is disclosed in Japanese Patent Laying Open Gazette No. 60-59484, as a prior art of interest to the present invention. According to the method described in this gazette as shown in FIG. 12, binarization is performed two times in accordance with two threshold values L1 and L2 when the image information is divided into bilevels and then only a signal component L in an intermediate region is taken out to extract a contour line.

In the above-described image information contour extracting method, it is necessary to set two high and low threshold values L1 and L2 at the time of binarization, but it is difficult to set the threshold values. For example, when the image signal to be binarized is a signal of a character which is very light in color and written on a white background or a signal of a character which is very dark in color and written on a black background, a level difference between the background and the character signals is small. Therefore, if a level difference between high and low threshold values is too large, the image signal can not be binarized at two levels as shown in FIG. 13, so that the contour line can not be extracted. In this case, the level difference between two threshold values may be reduced. However, since the image signal sometimes fluctuates due to a noise and the like, if this level difference is made too small, it is difficult to precisely extract a component in the intermediate region between two threshold values.

In addition, in an image comprising an intermediate tone such as a photograph, the image of the intermediate tone itself is destroyed or erroneously operated when binarized, as shown in FIG. 14.

SUMMARY OF THE INVENTION

It is an object of the present invention to provide an image signal processing apparatus capable of digitizing an image signal and easily extracting contours of image information in a signal at high speed.

It is another object of the present invention to provide an image signal processing apparatus capable of precisely extracting an information signal even when a density difference between an information signal and a background signal in an input image signal is small.

It is a further object of the present invention to provide an image signal processing apparatus capable of optionally converting a background to white or black when an input image signal comprises an intermediate tone signal having a pure white or pure black background component.

The present invention provides an image signal processing apparatus in which an analog image signal is converted to a digital image signal, the converted digital image signal is cyclicly shifted by a predetermined amount and then divided into multiple levels.

According to the present invention, a digital image signal is cyclicly shifted by adding or subtracting a predetermined amount of signal to or from the digital image signal. When an amount of cyclic shift is adjusted, a certain signal component can be moved to a first level side (for example, a black level side) or a certain signal component is moved to a second level side (for example, a white level side). Therefore, if one threshold value is set between the first level side and the second level side, the cyclicly shifted digital image signal can be binarized in reference to the threshold value.

In addition, when an amount of cyclic shift is adjusted, according to the present invention, a certain signal component can be moved to a first level side (for example, a black level side) or a certain signal component is moved to a second level side (for example, a white level side), so that contours can be extracted in reference to the signal moved to the first or second level side and a background color can be converted to white or black depending on which side the signal is moved. In addition, even if a density difference between the background signal and the information signal is small, the signal can be precisely extracted.

These objects and other objects, features, aspects and advantages of the present invention will become more apparent from the following detailed description of the present invention when taken in conjunction with the accompanying drawings.

BRIEF DESCRIPTION OF THE DRAWINGS

FIGS. 1 through 6 show a first embodiment of the present invention, in which:

FIG. 1 is a block diagram of a digital electrophotographic copying apparatus adopting the first embodiment of the present invention;

FIG. 2 is a block diagram showing a detailed construction of a scanner part 12;

FIG. 3 is a specific example of a circuit of a cyclic shifting apparatus;

FIGS. 4 and 5 are wave form charts showing operation of the apparatus in FIG. 1; and FIG. 6 is a block diagram showing an example of a construction of a circuit determining a direction and amount of cyclic shift by pre-scan.

FIGS. 7 through 11 show a second embodiment of the present invention, in which:

FIG. 7 is a block diagram of a digital electrophotographic copying apparatus adopting the second embodiment of the present invention;

FIG. 8 is a block diagram and an output wave form chart showing an example of a circuit for dividing into multiple levels;

FIGS. 9 and 10 are wave form charts showing operation of the apparatus in FIG. 7; and FIG. 11 is a sample showing an example of an original picture and a copy by the digital electrophotographic copying apparatus in accordance with the second embodiment.

FIGS. 12 through 14 are wave form charts showing a conventional example, in which:

FIG. 12 is a wave form chart describing a conventional method for extracting contours of image information; and FIGS. 13 and 14 are wave form charts for describing problems in the conventional image information contour extracting method.

DETAILED DESCRIPTION OF THE PREFERRED EMBODIMENTS

Description of First Embodiment

Figure 1:
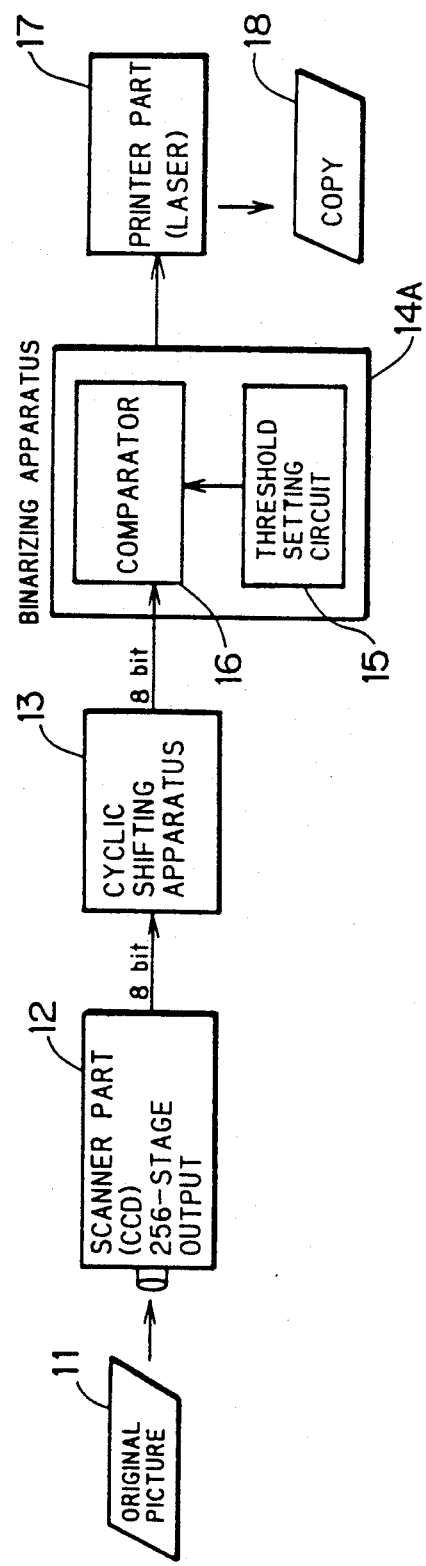

FIG. 1 is a block diagram showing a construction of a digital electrophotographic copying apparatus adopting a first embodiment of the present invention.

The digital electrophotographic copying apparatus comprises a scanner part 12 for reading an image of an original picture 11. The scanner part 12 comprises an image sensor such as CCD in which the read image of the original picture 11 is outputted as a digital image signal of 8 bits=256 stages. An output from the scanner part 12 is applied to a cyclic shifting apparatus 13 in which the digital image signal is cyclicly shifted by a predetermined amount. The cyclic shift means that data is cyclicly shifted in such a manner that a signal divided into 256 stages from 0 stage (a first level) until 255 stages (a second level) is shifted, for example from the first level side to the second level side by a certain amount (for example 20 stages) and data overflowing the 255 stages returns to 0 stage.

Digital data of 8 bits is cyclicly shifted by a predetermined amount in the cyclic shifting apparatus 13 and then binarized in a binarizing apparatus 14A. The binarizing apparatus 14A comprises a threshold value setting circuit 15 and a comparator 16 in which a threshold value previously set in the threshold setting circuit 15 is compared to a signal applied from the cyclic shifting apparatus 13 in the comparator 16 and an obtained signal is distributed the first level or the second level and then binarized.

An output from the binarizing apparatus 14A is a 1-bit signal composed of the first level or the second level and this output is applied to a printer part 17. The printer part 17 comprises well-known image forming mechanism such as a semiconductor laser, a polygon mirror for scanning light, a photoreceptor, a developing device and so on. The printer 17 forms an image in accordance with an output from the binarizing apparatus 14A. As a result, a copy 18 is provided.

Figure 2:
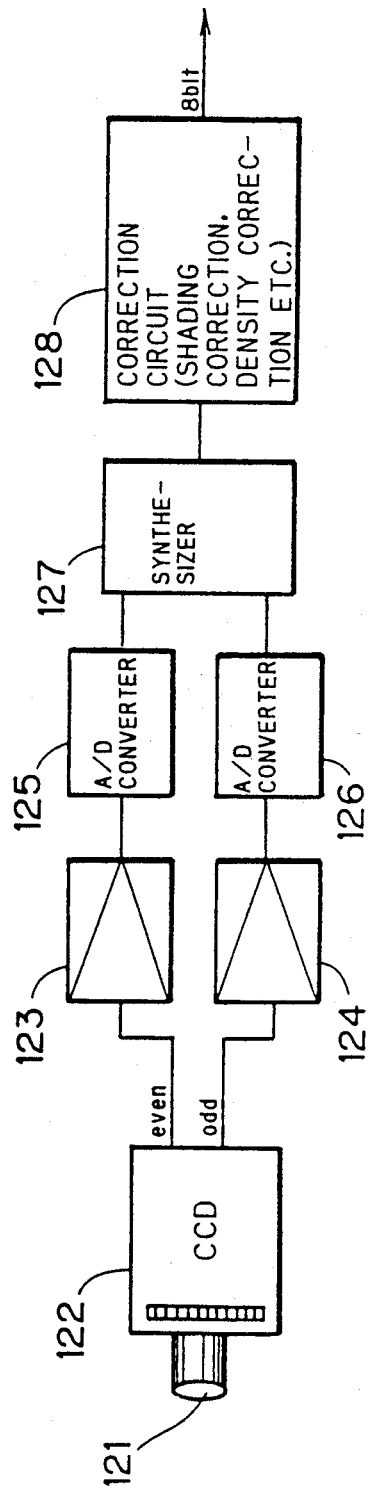

FIG. 2 is a block diagram showing a detailed construction of the scanner part 12. The scanner part 12 comprises an objective lens 121 and a CCD 122 to which data of the original picture 11 is applied through the objective lens 121. The CCD 122 converts an optical signal to an electrical signal and applies a signal of "even" and a signal of "odd" to an amplifiers 123 and 124, respectively. Signals amplified by the amplifiers 123 and 124 are converted to digital signals by A/D converters 125 and 126, respectively. Both signals are synthesized by a synthesizer 127. Then, an output from the synthesizer 127 is applied to a correction circuit 128 in which shading correction, density correction and the like are performed and then outputted as a 8-bit digital signal.

The detailed construction of the scanner part 12 is not limited to one shown in FIG. 2 and another construction may be adopted.

Figure 3:
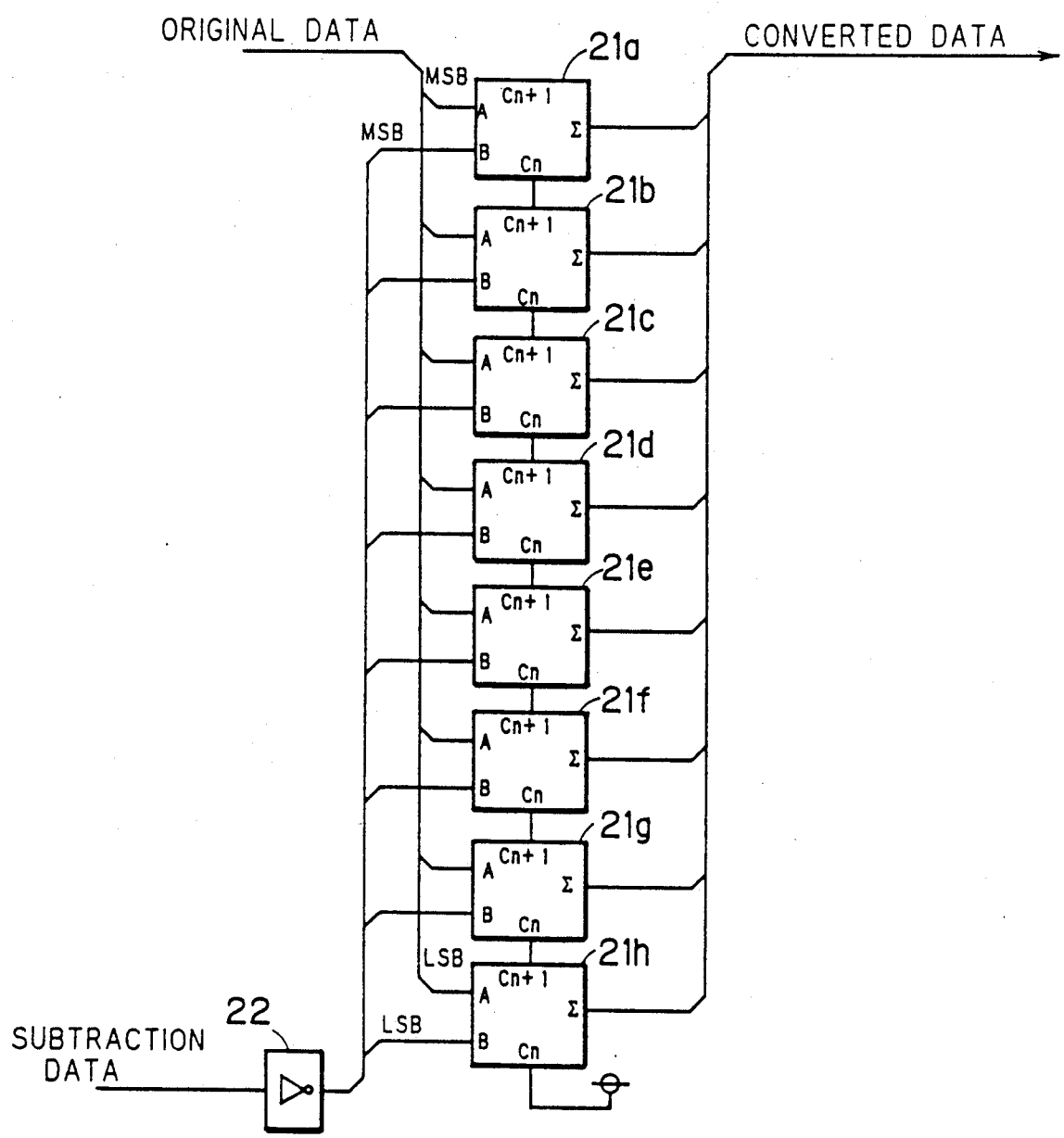

FIG. 3 is a block diagram showing an example of a circuit of the cyclic shifting apparatus 13. The cyclic shifting apparatus 13 comprises, for example eight full adders 21a, 21b, 21c, 21d, 21e, 21f, 21g and 21h connected in parallel in which a 8-bit digital image signal applied from the scanner part 12 is applied to them in such a manner that a high-order position is applied to one input terminal A of the full adder 21a, the following positions are correspondingly applied to the input terminals A of the full adders 21b through 21g and a low-order position of the 8-bit data is applied to one input terminal A of the full adder 21h.

On the other hand, subtraction data is applied to the other input terminals B of the full adders 21a through 21h through an inverter 22 in the same manner. Therefore, the 8-bit data is shifted by eight full adders 21a through 21h by a predetermined amount in accordance with the subtraction data and then outputted.

Figure 4:
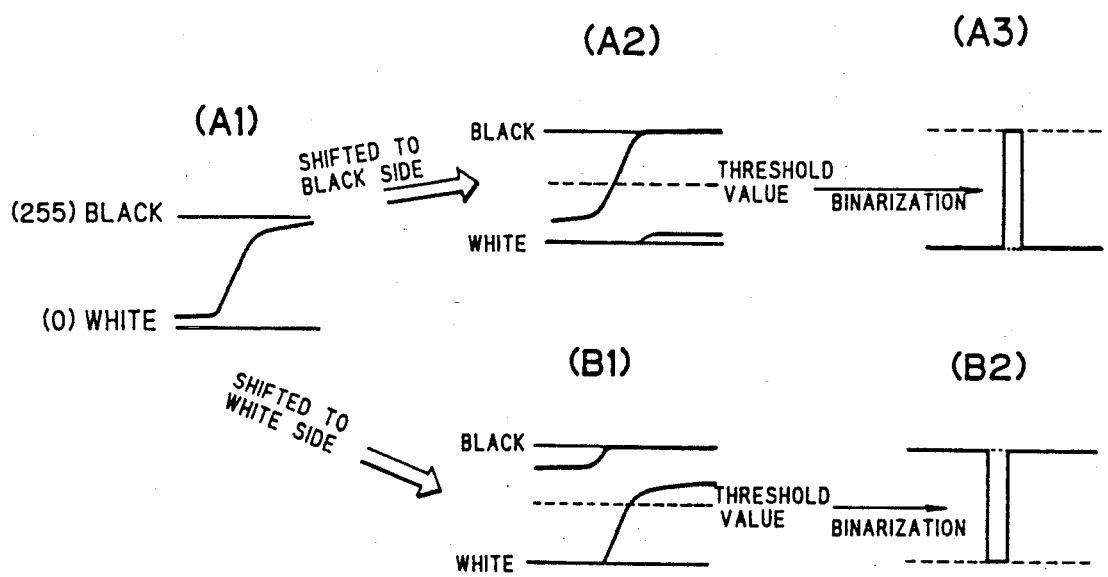

FIG. 4 is a wave form chart of a signal for describing one feature of the apparatus shown in FIG. 1.

A description is given with reference to FIGS. 1 through 4. It is assumed that the 8-bit digital image signal outputted from the scanner part 12 comprises a signal component of (A1) in FIG. 4. In this wave form chart, the lowest part designates a white level of 0 stage as a first level and the highest part designates a black level of 255 stages as a second level. This signal component is cyclicly shifted in the cyclic shifting apparatus 13 and becomes a signal shown in FIG. 4 (A2). More specifically, the signal component is cyclicly shifted to the black level side by predetermined levels. As a result, the white side component and the black side component of the input signal are collected on the white level side and a signal component in an intermediate region is collected on the black level side.

One threshold value is set between the black level and the white level in the threshold value setting circuit 15 in the binarizing apparatus 14A. Therefore, when the threshold value is compared with the signal component in FIG. 4 (A2), binarized signal in FIG. 4 (A3) is provided. A signal at high level is a signal component in the intermediate region in FIG. 4 (A1).

When the signal component in the intermediate region is extracted, a contour line of the image information can be extracted as described in the Japanese Patent Laying Open Gazette No. 60-59484.

Although the digital signal (shown in FIG. 4 (A1)) applied from the scanner part 12 is shifted to the black level side in the cyclic shifting apparatus 13 in FIG. 4 (A2), it may be shifted to the white level side. In this case, a signal wave form chart is shown in FIG. 4 (B1). If it is shifted to the white level side, the black side component and white side component of the input signal are collected on the black level side and the component in the intermediate region is left on the white level side. Therefore, when the cyclicly shifted image data is binarized, only the contour line of the image information becomes white as shown in FIG. 4 (B2).

In addition, although a direction of the cyclic shift is changed in the cyclic shifting apparatus 13 in this embodiment, the output of the binarizing apparatus 14A may be converted by a level converter.

Figure 5:
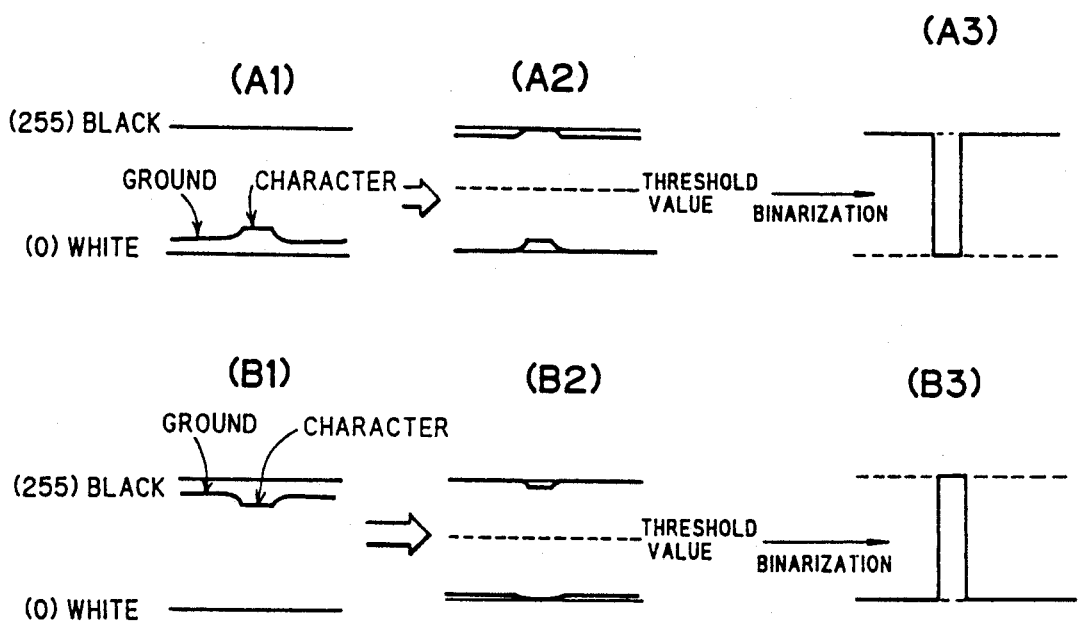

FIG. 5 is a signal wave form chart for describing another feature of the apparatus shown in FIG. 1, in which there is a small density level difference in a signal component outputted from the scanner part 12. For example, FIG. 5 (A1) shows an output component from the scanner part 12 when the original picture 11 has characters which are very light in color on a white ground. FIG. 5 (B1) shows an output component from the scanner part 12 when an original picture has red or blue characters on a dark ground. In these cases, since a density level difference between a background signal and a information signal is small, binarization is not successfully performed. Then, the signal component is cyclicly shifted to the black level side or the white level side and the background signal is moved to the black level side and the information signal is moved to the white level side (FIG. 5 (A2)), or the background signal is moved to the white level side and the information signal is moved to the black level side (FIG. 5 (B2)). More specifically, an amount shifted by the cyclic shifting apparatus 13 is selected in such a manner that it is slightly more than the level difference between the white level and the background signal or more than the level difference between the black level and the background signal.

As a result, when a threshold value set between the black level and the white level can be compared with the signal component after cyclicly shifted, the signal component can be binarized into the background signal and the information signal as shown in FIG. 5 (A3) or (B3).

Figure 6:
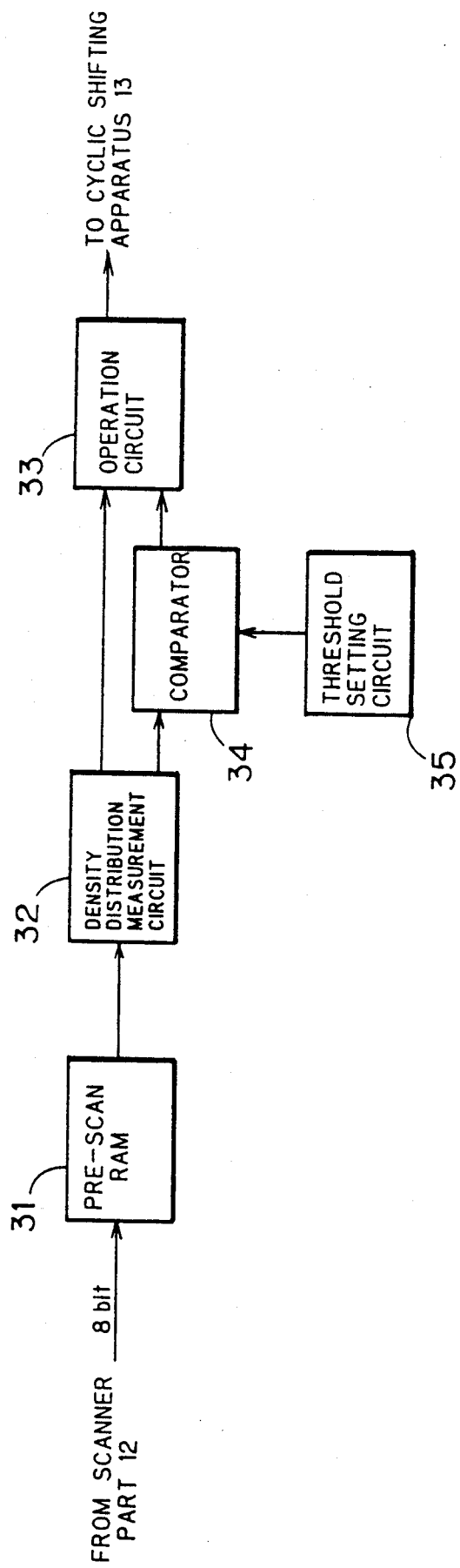

FIG. 6 is a block diagram showing an example of a circuit deciding a direction and an amount of cyclic shift. The original picture 11 is pre-scanned by the scanner part 12 and a 8-bit signal from the scanner part 12 is applied to a pre-scan RAM 31 shown in FIG. 6 and it is temporarily stored in the pre-scan RAM 31. A density distribution measurement circuit 32 connected to the pre-scan RAM 31 measures a density distribution of the 8-bit signal in the RAM 31. An output from the circuit is applied to an operation circuit 33 and a comparator 34. A threshold setting circuit 35 is connected to the comparator 34 to which a predetermined threshold value is applied from the threshold setting circuit. The threshold value is compared with an output from the density distribution measurement circuit 32 in the comparator 34 and its result is outputted to the operation circuit 33. Operation is performed in accordance with the signal applied from the density distribution measurement circuit 32 and the signal applied from the comparator 34 in the operation circuit 33 to calculate a direction and amount of cyclic shift. An output from the operation circuit 33 is applied to the cyclic shifting apparatus 13.

As described in the above embodiment, the input signal is converted to the digital image signal and then cyclicly shifted, because the digital signal can be easily cyclicly shifted and the cyclic shifting apparatus therefor is simple. Alternatively, an analog signal is cyclicly shifted without being converted and the shifted analog signal is binarized in reference to one threshold value.

Description of Second Embodiment

Figure 7:
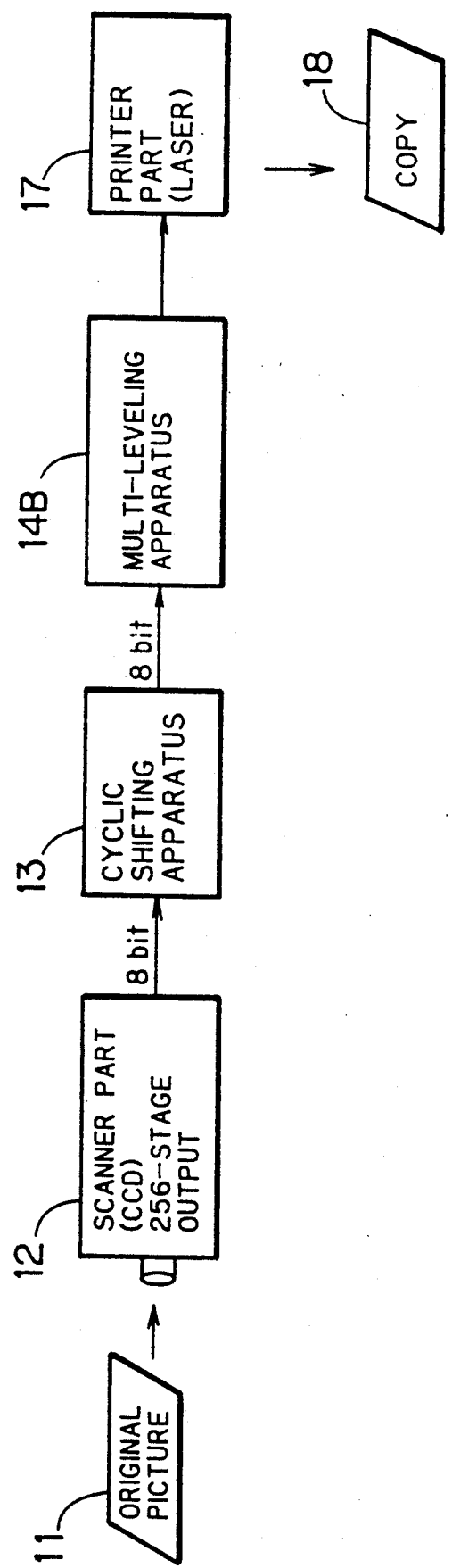

FIG. 7 is a block diagram showing a construction of a digital electrophotographic copying apparatus adopting a second embodiment of the present invention.

In FIG. 7, since the same reference numerals are allotted to those corresponding portions used in FIG. 1 and their operation is the same described in reference to FIG. 1, a description thereof is omitted here.

This digital electrophotographic copying apparatus differs from the one shown in FIG. 1 in that an apparatus for dividing a signal into multiple levels (hereinafter referred to as a multi-leveling apparatus) 14B is provided instead of binarizing apparatus 14A in the digital electrophotographic copying apparatus shown in FIG. 1. Therefore, in this digital electrophotographic copying apparatus, a 8-bit digital data cyclicly shifted by a predetermined amount in the cyclic shifting apparatus 13 is divided into multiple levels, for example pentarized in the multi-leveling apparatus 14B. Then, an output from the multi-leveling apparatus 14B is applied to a printer part 17.

Figure 8:
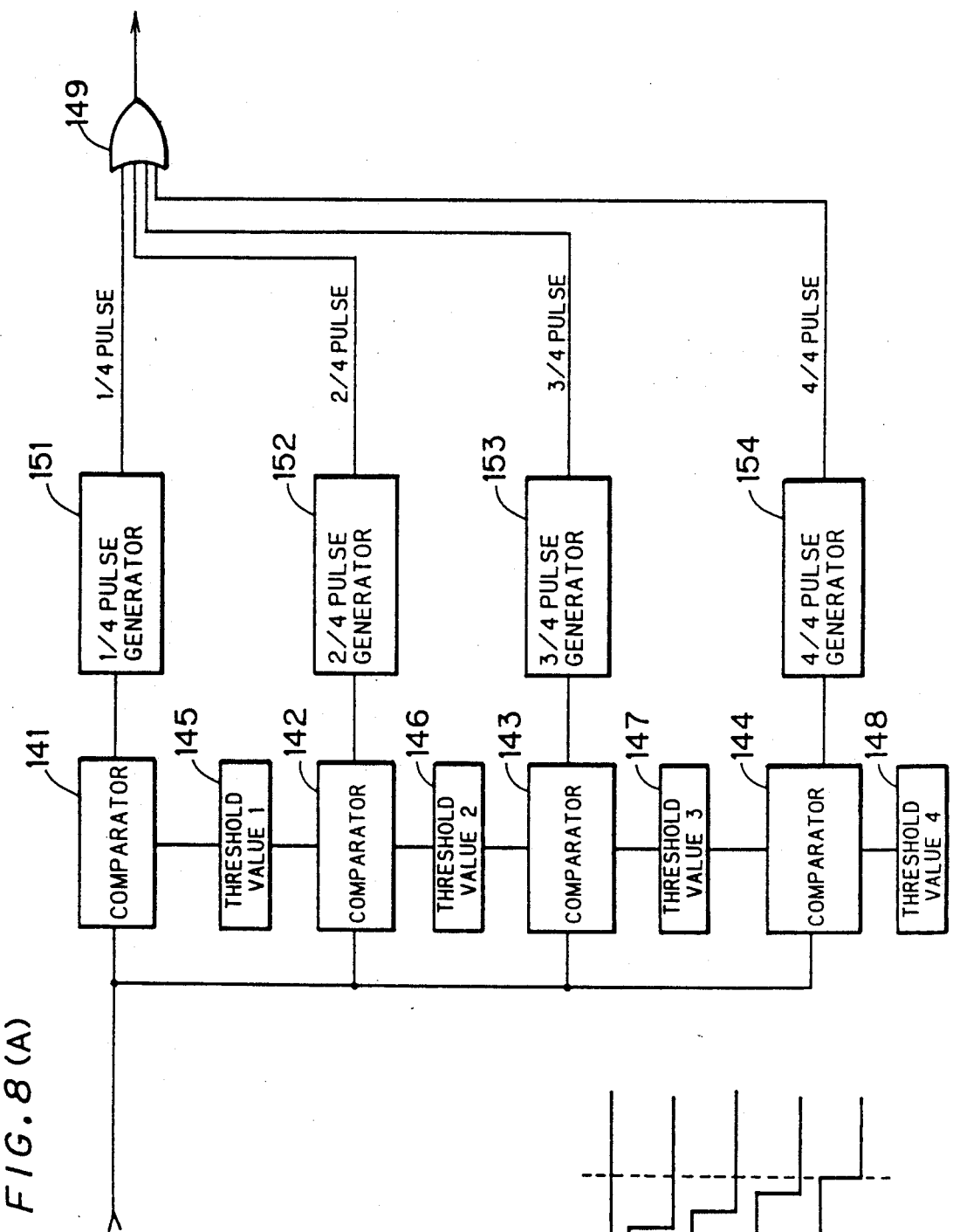
Figure 8:
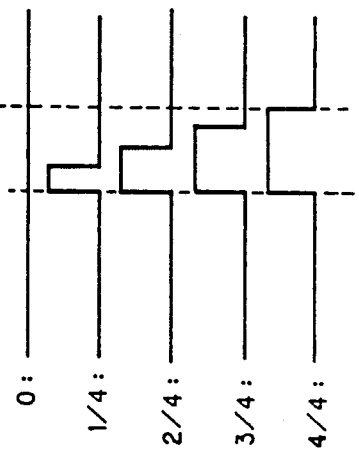

FIG. 8 (A) is a block diagram showing an example of a construction of a circuit for dividing a signal into multiple levels (hereinafter referred to as a multi-leveling circuit) 14B. Referring to FIG. 8 (A), pentarization circuit is shown as the multi-leveling circuit 14B. The pentarization circuit 14 comprises four comparators 141, 142, 143 and 144 connected in parallel and four threshold setting circuits 145, 146, 147 and 148 connected to the comparators 141 through 144, respectively. Different threshold values are set in the threshold setting circuits 145 through 148 connected to the comparators 141 through 144. Therefore, a pixel component inputted to this circuit is compared with predetermined threshold values in four comparators 141 through 144 and "1" or "0" is outputted from each of the comparators 141 through 144 in accordance with density of the pixel component.

Pulse generators 151 through 154 are connected to output sides of the comparators 141 through 144 and outputs from four pulse generators 151 through 154 go to an OR gate 149. Referring to the pulse generators 151 through 154, the ¼ pulse generator 151 generates a ¼ pulse in accordance with the input of "1" from the comparator 141, the 2/4 pulse generator 152 generates a 2/4 pulse in accordance with the input of "1" from the comparator 142, the ¾ pulse generator 153 generates a ¾ pulse in accordance with the input of "1" from the comparator 143 and the 4/4 pulse generator 154 generates a 4/4 pulse in accordance with the input of "1" from the comparator 144. If an output from each of the comparators 141 through 144 is "0", each of the pulse generators 151 through 154 does not generate a pulse.

Therefore, an output of the OR gate 149 is 0, ¼, 2/4, ¾ or 4/4 as shown in FIG. 8 (B) in accordance with an input of one pixel component.

The multi-leveling circuit 14B may be a circuit which uses a dither matrix, instead of the circuit shown in FIG. 8.

Figure 9:
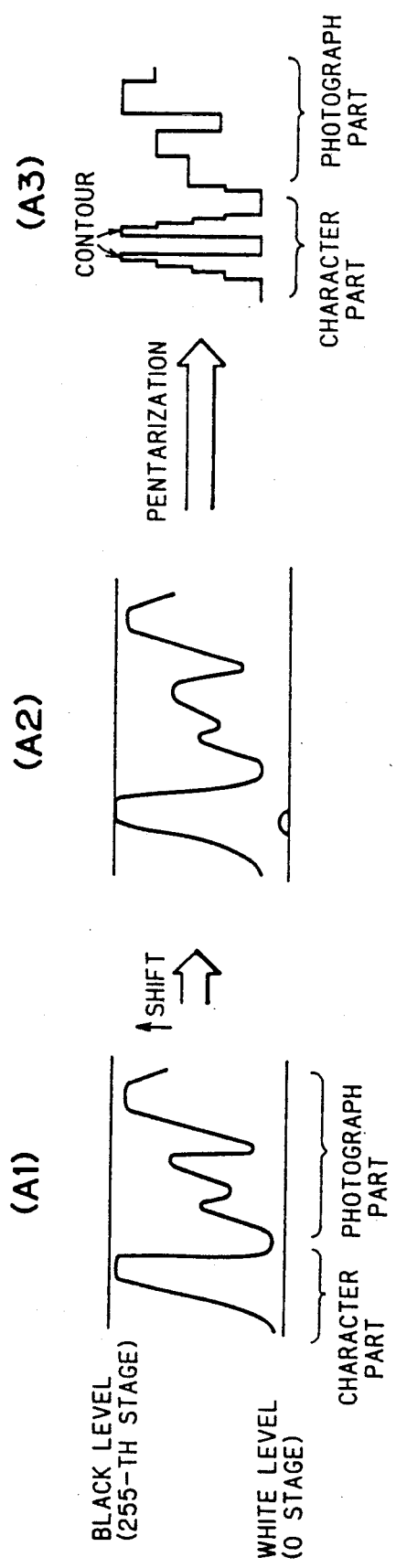

FIG. 9 is a signal wave form chart for describing one feature of the apparatus shown in FIG. 7.

Referring to FIGS. 7 through 9, it is assumed that the 8-bit digital image signal outputted from the scanner part 12 comprises a signal component having characters and a photograph as shown in FIG. 9 (A1). In this wave form chart, the lowest part is a white level of 0 step as a first level and the highest part is a black level of 255 stages as a second level. This signal component is cyclicly shifted in the cyclic shifting apparatus 13 as shown in FIG. 9 (A2). More specifically, the signal component is cyclicly shifted by a predetermined amount toward the black level side. As a result, only the darkest component in the character component is moved to the white level side.

When this is divided into multiple levels in the multi-leveling apparatus 14B, a signal shown in FIG. 9 (A3) is obtained. As shown in FIG. 9 (A3), a middle part of the character component becomes white and then its contours are extracted. The photograph component is divided into multiple levels while the original picture is almost as it is.

Figure 10:
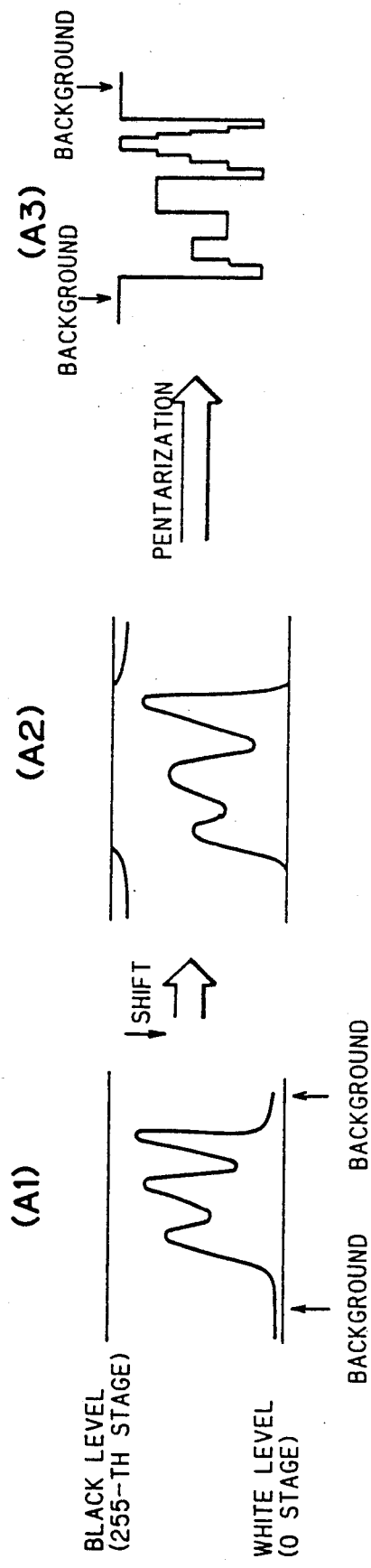

FIG. 10 is a signal wave form chart for describing another feature of the apparatus shown in FIG. 7 and shows a signal of a photograph in which a signal component outputted from the scanner part 12 has a pure white background.

When the signal component in FIG. 10 (A1) is cyclicly shifted toward the white level side, the background component is moved to the black level side (FIG. 10 (A2)). More specifically, an amount of cyclic shift is selected in such a manner that it may be slightly more than the level difference between white level and the background component to shift the signal component toward the white level side.

As a result, the white background is converted to black (FIG. 10 (A3)). In addition, when the background of the original picture 11 is black, the signal component is shifted in a reverse direction, with the result that the background can be converted to white.

Figure 11A:
Figure 11A:
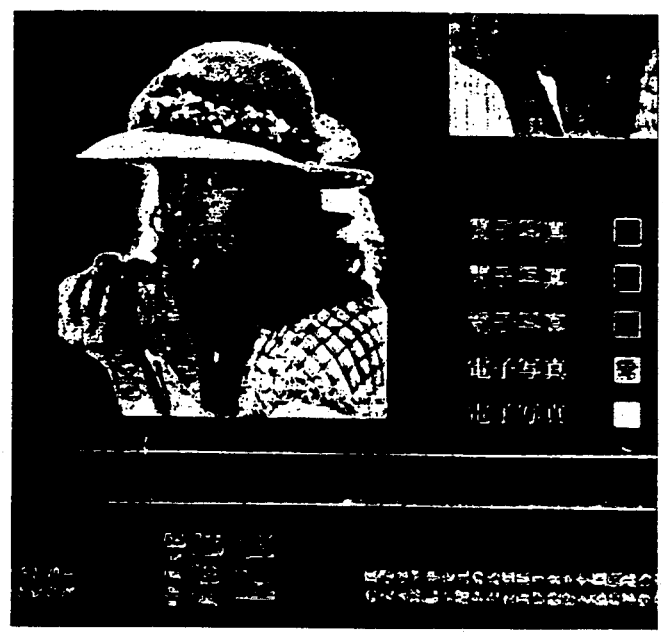
Figure 12:
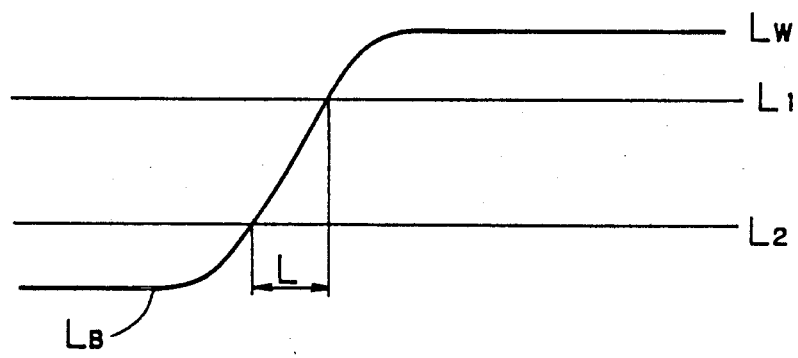
Figure 13:
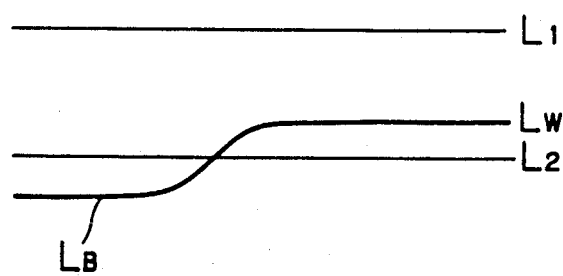
Figure 14:
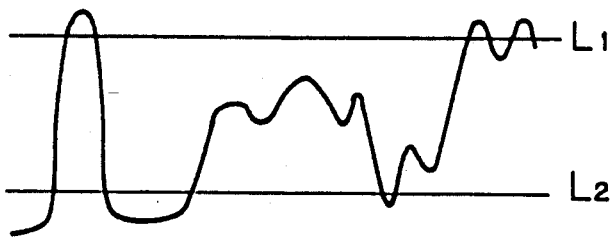

FIG. 11 shows an example when an original picture is processed by the digital electrophotographic copying apparatus in accordance with the embodiment. FIG. 11 (A) shows the original picture 11 and FIG. 11 (B) shows the copy 18 in which the background is converted to black. When the original picture 11 is compared with the copy 18 in FIG. 11, it is found that contours of dense characters in the original picture 11 are extracted in the copy 18 and characters which are light in color are clearly printed on the copy 18. In addition, it is also found that a portrait is almost as it is while a white background is converted to a black background.

The circuit shown in FIG. 6 can be also used as a circuit deciding a direction and amount of the cyclic shift in this embodiment.

In the above embodiment, the input signal is first converted to the digital image signal and then cyclicly shifted, because the digital signal can be easily cyclicly shifted and the cyclic shifting apparatus therefor is simple. Alternatively, the analog signal is cyclicly shifted without being converted and the signal obtained is divided into multiple levels in reference to a predetermined threshold value.

Although the present invention has been described and illustrated in detail, it is clearly understood that the same is by way of illustration and example only and in not to be taken by way of limitation, the spirit and scope of the present invention being limited only by the terms of the appended claims.

What is claimed is:

1. An image signal processing apparatus comprising:
   converting means for converting an analog image signal to a digital image signal;
   cyclic shifting means for cyclicly shifting the digital image signal converted by said converting means by a predetermined amount; and
   multi-leveling means for dividing said cyclicly shifted digital image signal into multiple levels;
   said image signal including a character component changing from a first level side to a second level side through intermediate levels, and an intermediate tone component;
   said amount shifted by said cyclic shifting means being determined in such a manner that a signal component on the second level side of the character component moves to the first level side, or a signal component on the first level side of the character component moves to the second level side, whereby the signal components on the first and second level sides can be moved to either the first level side or the second level side and the signal component in an intermediate region can be moved to the opposite level side; and
   said multi-leveling means extracting contours from the cyclicly shifted character component and multi-leveling the intermediate tone component as it is and then outputting them.

2. An image signal processing apparatus in accordance with claim 1, comprising means for pre-scanning document contents, detecting its density distribution and then calculating a shifting amount in reference to it in order to decide the amount to be shifted by the cyclicly shifting means.

3. An image signal processing apparatus comprising:
   converting means for converting an analog image signal to a digital image signal;
   cyclic shifting means for cyclicly shifting the digital image signal converted by said converting means by a predetermined amount; and
   multi-leveling means for dividing said cyclicly shifted digital image signal into multiple levels;
   said image signal including a background component close to a first level or a second level;
   said amount shifted by said cyclic shifting means being determined with reference to level differences from the first level or the second level to the background component, whereby the background component can be moved to either the first level side or the second level side; and
   said multi-leveling means outputting the background component moved to one level side as a black background and the background component moved to the other level side as a white background.

4. An image signal processing apparatus in accordance with claim 3, comprising means for pre-scanning document contents, detecting its density distribution and then calculating a shifting amount in reference to it in order to decide the amount to be shifted by the cyclicly shifting means.

5. An image signal processing apparatus comprising:
   converting means for converting an analog image signal to a digital image signal;
   cyclic shifting means for cyclicly shifting the digital image signal converted by said converting means by a predetermined amount; and
   binarizing means for binarizing said cyclicly shifted digital image signal in reference to a predetermined threshold value;
   said image signal including a component changing from a first level side through intermediate levels;
   said amount shifted by said cyclic shifting means being determined in such a manner that a signal component on the second level side may move to the first level side or a signal component on the first level side may move to the second level side, whereby the signal components on the first and second level sides can be moved to either the first level side or the second level side and the signal component in an intermediate region can be moved to the opposite level side; and
   said binarizing means divides the signal component of the first and second level sides and the signal component in the intermediate region into bilevels in reference to said predetermined one threshold value and extracts the signal component in the intermediate region only and then outputs said signal component in the intermediate region.

6. An image signal processing apparatus in accordance with claim 5, comprising means for pre-scanning document contents, detecting its density distribution and then calculating a shifting amount in reference to the distribution in order to decide the amount to be shifted by the cyclicly shifting means.

7. An image signal processing apparatus comprising;
converting means for converting an analog image signal to a digital image signal;
cyclic shifting means for cyclicly shifting the digital image signal converted by said converting means by a predetermined amount; and
binarizing means for binarizing said cyclicly shifted digital image signal in reference to a predetermined threshold value;
said image signal including a component having a small level difference between an information signal and a background signal,
said amount shifted by said cyclic shifting means being determined in reference to levels from the first level or the second level to the background signal, whereby the information signal is moved to either the first level side or the second level side and the background signal is moved to the opposite level side, and
said binarizing means divides the information signal moved to one level side and the background signal moved to the other level side into bilevels in reference to said predetermined one threshold value and extracts said information signal and outputs said information signal.

8. An image signal processing apparatus in accordance with claim 7, comprising means for pre-scanning document contents, detecting its density distribution and then calculating a shifting amount in reference to the distribution in order to decide the amount to be shifted by the cyclicly shifting means.

* * * * *